US00RE43424E

(19) United States
(12) Reissued Patent
Barnett

(10) Patent Number: US RE43,424 E
(45) Date of Reissued Patent: May 29, 2012

(54) NANOCRYSTALLINE HOT RUNNER NOZZLE TIP

(75) Inventor: Daniel Wayne Barnett, Plainfield, NH (US)

(73) Assignee: Husky Injection Molding Systems Ltd., Bolton, Ontario (CA)

(21) Appl. No.: 12/931,865

(22) Filed: Feb. 11, 2011

Related U.S. Patent Documents

Reissue of:
(64) Patent No.: 7,494,336
Issued: Feb. 24, 2009
Appl. No.: 11/743,760
Filed: May 3, 2007

(51) Int. Cl.
*B29C 45/20* (2006.01)
(52) U.S. Cl. ..... 425/549; 264/328.15
(58) Field of Classification Search ..... 425/549; 264/328.15; 347/54
See application file for complete search history.

(56) References Cited

U.S. PATENT DOCUMENTS 5,208,052 A * 5/1993 Schmidt et al. ..... 425/549
5,879,727 A * 3/1999 Puri ..... 425/549
6,164,954 A * 12/2000 Mortazavi et al. ..... 425/549
6,302,680 B1 * 10/2001 Gellert et al. ..... 425/549
6,609,902 B1 * 8/2003 Blais et al. ..... 425/549
6,713,011 B2 * 3/2004 Chu et al. ..... 264/465
6,733,682 B1 * 5/2004 Bjorkman et al. ..... 216/9
7,334,876 B2 * 2/2008 Silverbrook et al. ..... 347/54

OTHER PUBLICATIONS

Nature, vol. 41931, Oct. 2002 pp. 912-914, 2002 Nature Publishing Group.
Nature, vol. 41931 Oct. 2002 pp. 887-888, 2002 Nature Publishing Group.

* cited by examiner

*Primary Examiner* — Timothy Heitbrink
(74) *Attorney, Agent, or Firm* — Husky Intellectual Property Services

(57) ABSTRACT

The present invention is a nozzle for an injection molding runner system where parts of the nozzle, and in particular the nozzle tip are made from a nanocrystalline material. Nanocrystalline materials used include nanocrystalline copper and nanocrystalline nickel, which have high thermal conductivity and increased material strength. A conventional form of the metal is worked till its grains are reduced in size to less than 100 nm to achieve the desired properties.

40 Claims, 3 Drawing Sheets

NANOCRYSTALLINE HOT RUNNER NOZZLE TIP

Matter enclosed in heavy brackets [ ] appears in the original patent but forms no part of this reissue specification; matter printed in italics indicates the additions made by reissue.

SUMMARY OF INVENTION

The present invention relates to hot runner nozzles, and the materials used to manufacture them. More specifically, the present invention relates to the use of nanocrystalline materials for hot runner nozzles.

BACKGROUND OF INVENTION

The state of the art includes various nozzles and tips for hot runner injection molding systems. Hot-runner nozzles are typically either a valve-gate style or a hot-tip style. In the valve-gate style, a separate stem moves inside the nozzle and tip acting as a valve to selectively start and stop the flow of resin through the nozzle. In the hot-tip style, a small gate area at the end of the tip freezes off to thereby stop the flow of resin through the nozzle.

It is important that the nozzle tip provide the right amount of heat at the gate area to keep the plastic in a liquid state as it flows through the gate, but also that it allows the plastic to freeze in a reasonable time when flow has stopped. To satisfy these functional requirements, it is desired to use highly thermally conductive materials for the nozzle tip. The second critical function of the tip is that it should sustain high plastic pressures that may reach 40,000 psi (275 MPa) or higher.

The requirement for nozzle tips to have a high thermal conductivity is contradictory to the requirement for an increased strength since most metals that transfer heat well are "face centered cubic" (FCC) metals such as copper or nickel. FCC metals are typically much weaker than "body centered cubic" (BCC) metals such as iron or chromium. The tip must also resist corrosion, and resist wear when used with plastics containing fillers such as glass or other particulate materials.

U.S. Pat. No. 5,208,052 to Schmidt et al. teaches a tip insert made from beryllium copper, having a high thermal conductivity, and a retainer made from titanium alloy having low thermal conductivity.

For more wear-resistant tips, U.S. Pat. No. 6,302,680 to Gellert et al. discloses a tip insert made of a material, such as beryllium copper or tungsten carbide copper, having a combination of thermal conductivity and wear and corrosion resistance suitable for the material being molded. The nozzle seal, which also retains the tip insert, is made of suitable wear and corrosion resistant material, such as stainless or H-13 tool steel.

U.S. Pat. No. 6,164,954 to Mortazavi et al. also discloses the use of materials for the tip insert that exhibit high wear resistance and good thermal conductivity, such as carbide and tungsten carbide. Mortazavi also discloses the use of materials for the retainer that have good thermal conductivity, such as Ti/Zr-carbide.

U.S. Pat. No. 5,879,727 to Puri discloses a nozzle tip preferably made of a material with a relatively high thermal conductivity, such as copper-based alloys. The tip threadably attaches to the nozzle, and a seal ring, made of relatively high wear resistant material such as H-13, 4140 or P-20 tooling metals, attaches to the tip through an insulator made of a low thermally conductive material such as titanium.

SUMMARY OF THE INVENTION

According to a first broad aspect of the invention, there is provided a nozzle for an injection molding runner system, comprising an elongate nozzle body; and a nozzle tip and a melt channel extending along a longitudinal axis between the nozzle body and the nozzle tip. At least one of the nozzle body and the nozzle tip is made from a nanocrystalline material.

According to a second broad aspect of the invention, there is provided a nozzle for an injection molding runner system, comprising an elongate nozzle body; and a nozzle tip and a melt channel extending along a longitudinal axis between the nozzle body and the nozzle tip. At least one of the nozzle body and the nozzle tip is coated with either a nanocrystalline material or a nano-composite material.

According to a third broad aspect of the invention, there is provided a nozzle tip for attachment to nozzle for an injection molding runner system, wherein the nozzle tip is made from a nanocrystalline material.

BRIEF DESCRIPTION OF THE DRAWINGS

Objects and advantages of the present invention will become apparent to those skilled in the art upon reading the following detailed description of non-limiting embodiments of the present invention, in conjunction with the accompanying drawings, wherein like reference numerals have been used to designate like elements, and wherein.

DETAILED DESCRIPTION OF THE INVENTION

Figure 1:
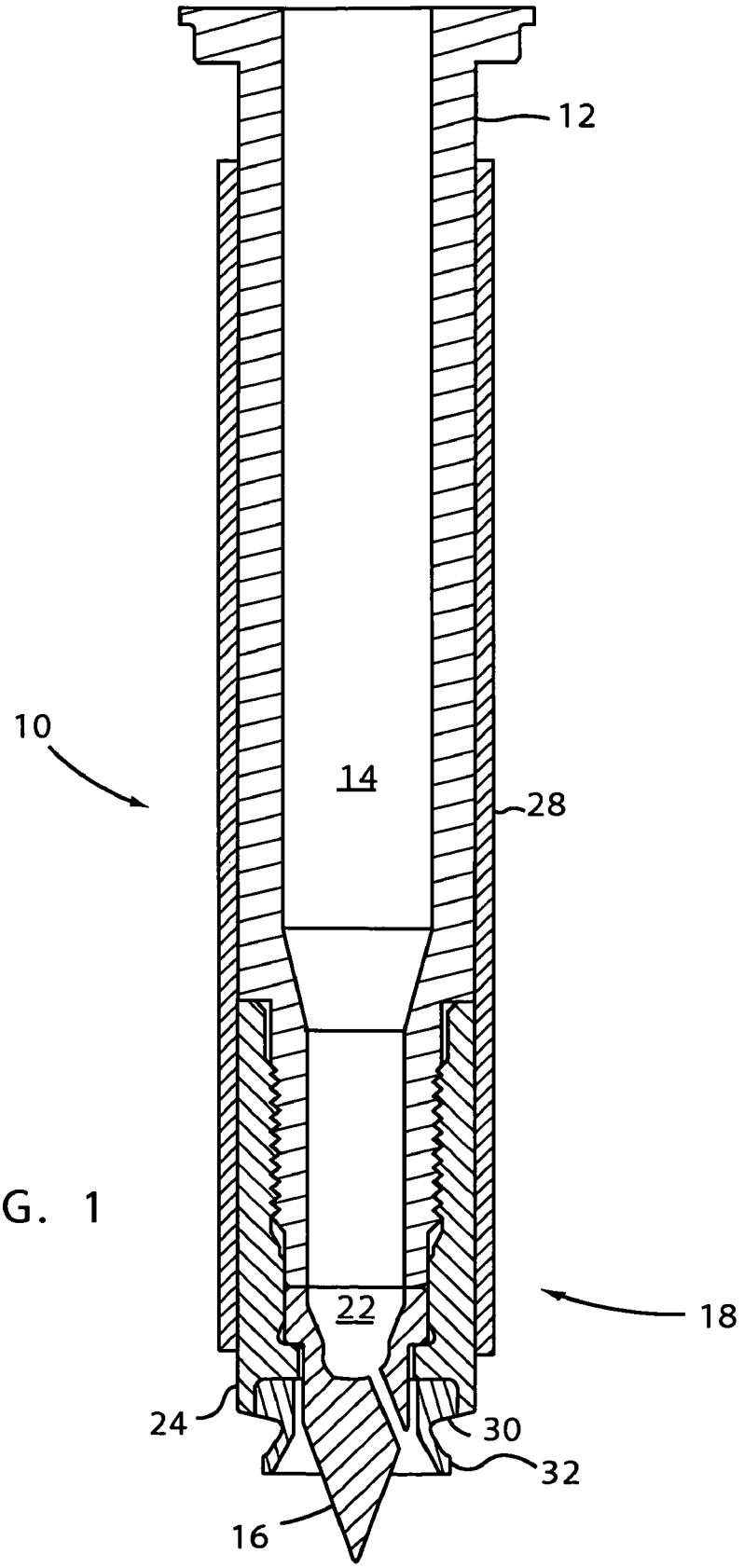
FIG. 1 is a longitudinal cross-sectional view of a preferred embodiment of a nozzle of the present invention wherein a tip retainer is installed externally on the nozzle housing.
Figure 2:
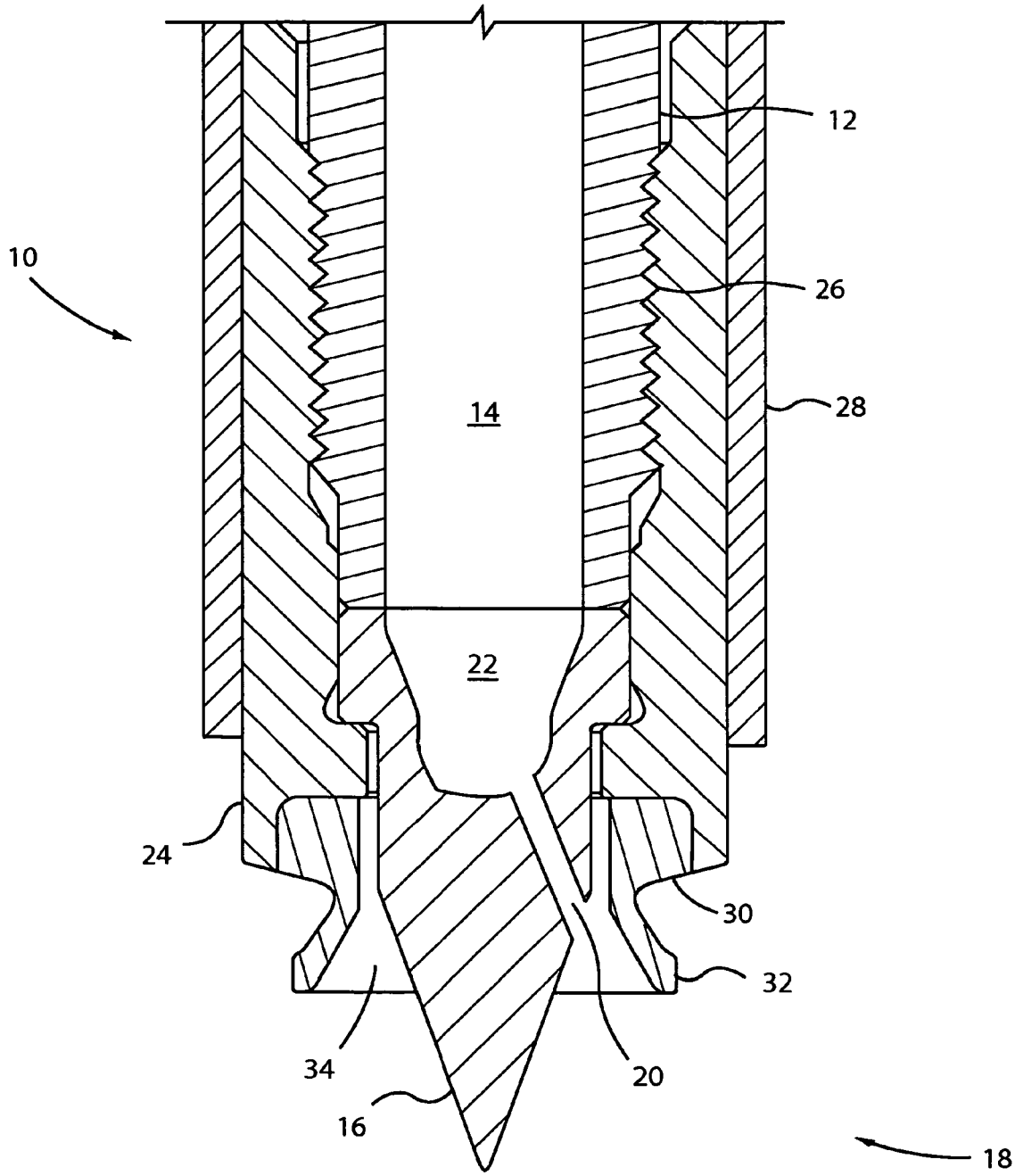
FIG. 2 is a detailed view of a portion of the view of FIG. 1.

With reference to FIG. 1-2, a nozzle for an injection molding machine in accordance with a preferred embodiment of the invention is shown generally at 10. The nozzle 10 comprises an elongated nozzle housing 12 having a melt channel 14 therethrough that is in fluid communication with a source of pressurized molten material (not shown) in a well known manner. A nozzle tip 16 is installed at the proximal end 18 of the nozzle housing 12 so that a melt channel 22 which is formed in nozzle tip 16 is in fluid communication with the melt channel 14 formed in nozzle housing 12. Nozzle tip 16 further defines at least one outlet aperture 20 so that the molten material in melt channel 22 can exit nozzle 10. In a preferred embodiment, nozzle tip 16 is retained at the proximal end 18 of nozzle housing 12 by a tip retainer 24 that is removably affixed to a proximal end 18 of the nozzle housing by threads 26 or their functional equivalent. Tip retainer 24 is preferably configured to receive and retain a nozzle tip 16 when tip retainer 24 is screwed onto proximal end 18 of nozzle housing 12. In this embodiment, the nozzle housing 12 and tip retainer 24 are constructed, arranged and threaded such that the tip retainer 24 installs on external threads on the nozzle housing 12. In the embodiment shown, the nozzle housing 12 and tip retainer 24 are substantially cylindrical in cross section with substantially equal outside diameters so that a substantially cylindrical external heater 28 can be installed over nozzle housing 12 and tip retainer 24. Heater 28 supplies heat to nozzle housing 12 and tip retainer 24 to keep the material in melt channel 14 and melt channel 22 molten.

During operation of nozzle 10, heater 28 directly heats the nozzle housing 12 and tip retainer 24 which transfer heat to nozzle tip 16 and the molten material in melt channel 14 and melt channel 22. As discussed above, enough heat must be supplied to nozzle tip 16 to open the gate at the beginning of the injection cycle and keep it open during the injection process. The tip must not be so hot that it does not allow the gate to freeze after packing is complete.

As discussed above, the prior art injection molding nozzles typically use nozzle tips made from a highly thermally conductive material, such as beryllium copper. The tip retainer and nozzle seal are made of materials with lower thermal conductivity, such as various stainless and tool steels. According to the presently-illustrated embodiment, the nozzle tips are manufactured from a nanocrystalline material such as nanocrystalline copper, nanocrystalline nickel or alloys of nanocrystalline copper or nanocrystalline nickel. According to other preferred embodiments, other portions of the nozzles 10, such as the tip retainer and the nozzle housing can also be manufactured from a nanocrystalline material. Nanocrystalline materials are discussed in greater detail below.

Figure 3:
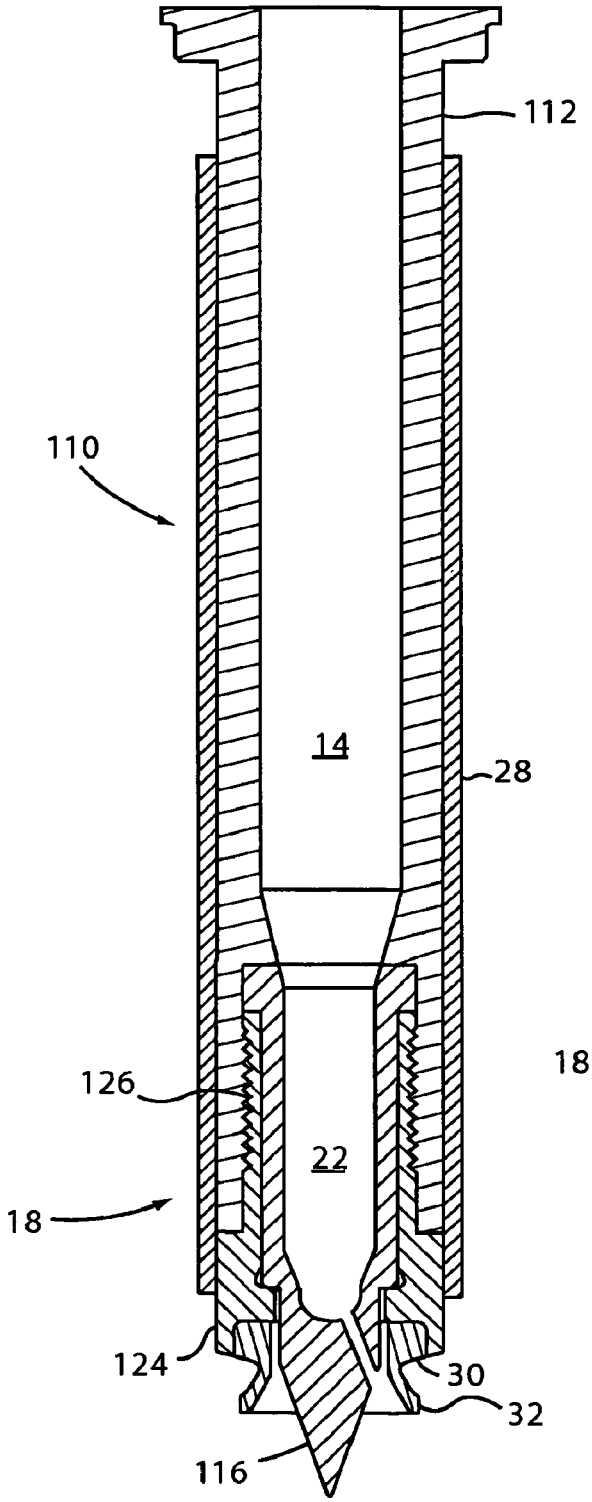
FIG. 3 is a longitudinal cross-sectional view of another preferred embodiment of a nozzle of the present invention wherein a tip retainer is installed internally in the nozzle housing.

In another preferred embodiment, the tip retainer may thread into internal threads in the nozzle housing. Referring to FIG. 3, which illustrates one such embodiment, in injection nozzle 110 the nozzle housing 112 and tip retainer 124 are configured with internal threads 126 in nozzle housing 112 and mating external threads on tip retainer 124. The tip retainer 124 installs in the internal threads 126 to retain nozzle tip 116.

Figure 4:
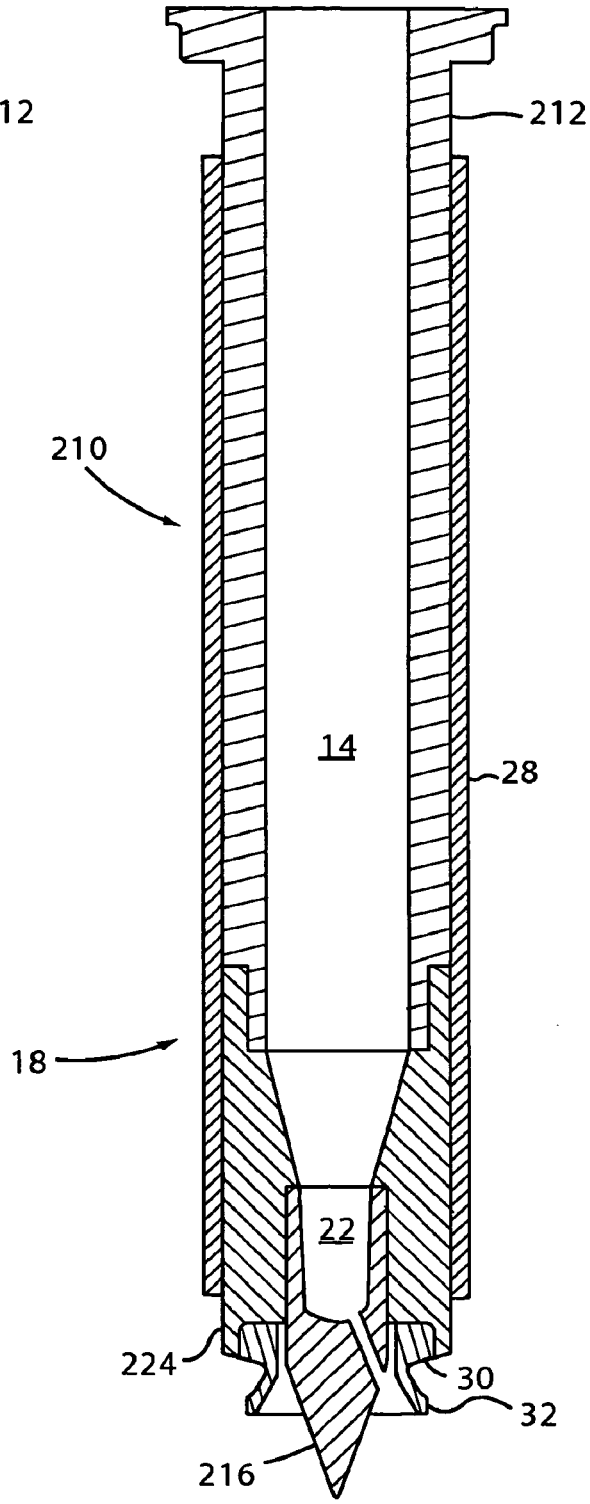
FIG. 4 is a longitudinal cross-sectional view of another preferred embodiment of a nozzle of the present invention wherein a tip retainer is brazed or welded to the nozzle housing, and the nozzle tip is attached to the tip retainer with a low-temperature brazing material, or by a form of welding such as electron beam welding.

Referring to FIG. 4, alternatively, in yet another preferred embodiment, the invention can be configured without a removable tip retainer. In injection nozzle 210, the tip retainer 224 could be an integral portion of the nozzle housing 212. When made of a different material than that of the nozzle housing 212, the retainer portion 224 may be welded or brazed with high temperature brazing material to the nozzle housing 212. The nozzle tip 216 could be attached with the tip retainer 224 by brazing with a relatively low-temperature brazing material which would still allow nozzle tip 216 to be removed from tip retainer 224 by reheating the assembly to a temperature high enough to melt the low-temperature brazing material, but not so high as to melt the high temperature brazing material. Alternatively, the nozzle housing 212 and tip retainer 224 could be one integral piece made of the same material.

In either of the embodiments of FIGS. 3 and 4, heater 28 could be an external heater such as that illustrated, or it could be made integral with nozzle housing and tip retainer, as is well known in the art, since the nozzle housing and tip retainer are unitized. The invention encompasses all of those embodiments as well as any other tip/nozzle housing combination wherein the tip is retained against or in the nozzle housing.

In all the embodiments above, optional nozzle seal 30 is affixed to the proximal end of tip retainer 24, 124, or 224, and has a flange 32 which contacts and seals against the mold (not shown). It should be noted, that one of ordinary skill in the art is familiar with a myriad of configurations for nozzle seals and the like that may include a bubble area 34 formed between flange 32 and nozzle tip 16 where molten material is allowed to collect to enhance thermal insulation of the nozzle 10 from the mold. The present invention is not limited to the one configuration shown and described herein, but contemplates all known configurations for nozzle seals and the like.

As discussed previously, nanocrystalline materials are used to form parts of the hot runner nozzles, and in particular, the nozzle tip. Preferably, a face centered cubic metal such as copper or nickel is used in a nanocrystalline form. Most metals are formed of many randomly oriented crystalline regions, commonly referred to as "grains". Conventional nickel and copper have grains with an average size greater than 10,000 nm. Nanocrystalline materials are formed by reducing the average size of grains within the material, which in turn causes the boundaries between grains to make up a larger part of the material. Nanocrystalline materials have grains that are equal to or less than 100 nm on average. Preferably, the final grain size of the nanocrystalline form of the material is less then 50 nm on average, and in one embodiment, preferably less than 30 nm on average.

FCC metals are particularly desirable for nanocrystallization, as they typically have the high thermoconductivy desired for hot runner nozzles. Conventional, unalloyed copper can have a thermal conductivity of approximately 400 W/mK), and conventional unalloyed nickel has a thermal conductivity of around 55 W/mK. Beryllium copper alloys can achieve thermal conductivities of around 250 W/mK. Nanocrystalline materials retain most, or all of their thermal conductivity. In contrast, alloys of BCC material like H-13 steel have thermal conductivities of 25 W/mK or less.

As discussed previously, a short-coming of FCC metals is that they are relatively weak, having ultimate strengths of less than 500 MPa. Nanocrystallization of an FCC metal increases the amount of grain boundaries within the material, typically increasing the material strength while substantially retaining the high thermal conductivity. Nanocrystalline Cu or Ni can exceed the strength of the majority of high strength steels currently in use (such as H-13 steel). Nanocrystalline copper has been manufactured with an ultimate strength approaching 1500 MPa, and nanocrystalline nickel has been manufactured with an ultimate strength exceeding 2000 MPa. It is contemplated that alloys of FCC metals can also be manufactured in a nanocrystalline form, so that nanocrystalline copper alloy or nanocrystalline nickel alloy could also be used for some embodiments.

It is contemplated that a nanocrystalline material can include grains of substantially differing sizes in different ratios. For example, according a preferred embodiment, a nanocrystalline copper could be made with 75% nanocrystalline grains and 25% microcrystalline grains (i.e., grains having an average size greater than 100 nm) dispersed around the material.

In at least one preferred embodiment, the nozzle tips 16 are machined from bulk nanocrystalline nickel or copper stock. To create the bulk nanocrystalline stock, conventional metal stock is first nanocrystallized via one of several methods, which commonly involve the application of large shearing strains to the stock while under high pressure, which is generally known as severe plastic deformation (SPD). This treatment can be achieved via extrusion, bending, equal channel angular extrusion, twisting, or rolling. It is contemplated that the SPD treatment may be applied to the working stock multiple times to achieve the right size of nanocrystalline crystals. Another possible treatment involves rolling the stock and subsequently low-temperature annealing the stock. Other methods of manufacturing bulk nanocrystalline materials include powder compaction and electrodeposition.

In another preferred embodiment, the nozzle tips 16 are machined from a common metal stock, but are subsequently treated with a nanocrystalline coating. For some embodiments, nozzle tips with a nanocrystalline coating may provide a less expensive alternative to solid nanocrystalline tips while providing much of the benefit. A nanocrystalline FCC metal can be applied via coating, or a nanocrystalline ceramic may also be used. Coatings may also prove attractive should the supply of nanocrystalline material be limited. The nanocrystalline coating is typically applied via electrodeposition, thermal spraying, plasma spraying, pulsed laser deposition or variants of chemical vapor deposition (CVD).

While the above discussion contemplates the use of a nanocrystalline material for nozzle tips, it is also contemplated that nanocrystalline materials can be used for other portions of the nozzle assembly, where a combination of thermal conductivity and strength is desired. For example, the tip retainer can also be manufactured from a nanocrystalline material, often having a different thermal conductivity than that of the nozzle tip. For nozzles that have a unitary housing and tip body, the whole housing and tip structure can be manufactured from a nanocrystalline material.

Those of skill in the art will recognize that the invention is not limited to nozzles using hot tip style gates, but that it also encompasses nozzles using valve gates, including pin valve gates and slide valve gates.

Non-limiting embodiments of the present invention can provide a nozzle for an injection mold runner assembly that use parts made of nanocrystalline materials to achieve a high degree of thermal conductivity while also benefiting from a high material strength. In particular, nozzle tips can be machined from a nanocrystalline material.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. An injection molding nozzle for an injection molding runner system, comprising:

a nozzle body; and a nozzle tip; and a melt channel extending along a longitudinal axis between the nozzle body and the nozzle tip;

wherein the at least one of the nozzle body and the nozzle tip is made from a nanocrystalline material.

2. The nozzle of claim 1, wherein the nanocrystalline material is formed from grains, and a majority of the grains are sized less than 100 nm.

3. The nozzle of claim 2, wherein at least 75% of the grains are sized less than 100 nm.

4. The nozzle of claim 3, wherein at least 75% of the grains are sized less than 50 nm.

5. The nozzle of claim 4, at least 75% of the grains are sized less than 30 nm.

6. The nozzle of claim 5, wherein a remaining percentage of the nanocrystalline material has a grain size of at least 100 nm.

7. The nozzle of claim 2, wherein the nanocrystalline material is a nanocrystalline form of a face centered cubic metal.

8. The nozzle of claim 7, wherein the nanocrystalline material is one of nanocrystalline copper, a nanocrystalline copper alloy, *a* nanocrystalline nickel and a nanocrystalline nickel alloy.

9. The nozzle of claim 7, wherein the nanocrystalline material is formed from a non-nanocrystalline material using one of severe plastic deformation, powder compaction or electrodeposition.

10. The nozzle of claim 2, wherein the nozzle tip is retained against the nozzle body by a tip retainer.

11. An injection molding nozzle tip for attachment to *a* nozzle for an injection molding runner system, wherein the nozzle tip is made from a nanocrystalline material.

12. The nozzle tip of claim 11, wherein the nanocrystalline material is formed from grains, and a majority of the grains are sized less than 100 nm.

13. The nozzle tip of claim 12, wherein at least 75% of the grains are sized less than 100 nm.

14. The nozzle tip of claim 13, *wherein* at least 75% of the grains are sized less than 50 nm.

15. The nozzle tip of claim 14, wherein at least 75% of the grains are sized less than 30 nm.

16. The nozzle tip of claim 15, wherein a remaining percentage of the nanocrystalline material has a grain size of at least 100 nm.

17. The nozzle of claim 12, wherein the nanocrystalline material is a nanocrystalline form of a face centered cubic metal.

18. The nozzle tip of claim 17, wherein the nanocrystalline material is one of nanocrystalline copper, a nanocrystalline copper alloy, nanocrystalline nickel and a nanocrystalline nickel alloy.

19. The nozzle tip of claim 17, wherein the nozzle tip is retained against a nozzle body on [an by] a tip retainer.

20. An injection molding nozzle for an injection molding runner system, comprising:

a nozzle body;

a nozzle tip; and a melt channel extending along a longitudinal axis between the nozzle body and the nozzle tip;

wherein the at least one of the nozzle body and the nozzle tip is coated with one of a nanocrystalline material and a nano-composite material.

21. The nozzle of claim 20, wherein the at least one of the nozzle body and the nozzle tip is coated with a nanocrystalline material using one of electrodeposition, thermal spraying, plasma spraying, pulsed laser deposition or chemical vapor deposition.

22. An injection molding [a] nozzle tip for attachment to *a* nozzle for an injection molding runner system, wherein the nozzle tip is coated with [a] one of a nanocrystalline material and a nano-composite material.

*23. A hot runner nozzle comprising at least one component made from a nanocrystalline material.*

*24. The hot runner nozzle of claim 23, wherein the nanocrystalline material is formed from grains, and a majority of the grains are sized less than 100 nm.*

*25. The hot runner nozzle of claim 24, wherein at least 75% of the grains are sized less than 100 nm.*

*26. The hot runner nozzle of claim 25, wherein at least 75% of the grains are sized less than 50 nm.*

*27. The hot runner nozzle of claim 26, wherein at least 75% of the grains are sized less than 30 nm.*

*28. The hot runner nozzle of claim 27, wherein a remaining percentage of the nanocrystalline material has a grain size of at least 100 nm.*

*29. The hot runner nozzle of claim 24, wherein the nanocrystalline material is a nanocrystalline form of a face centered cubic material.*

*30. The hot runner nozzle of claim 29, wherein the nanocrystalline material is one of nanocrystalline copper, a nanocrystalline copper alloy, nanocrystalline nickel and a nanocrystalline nickel alloy.*

*31. The hot runner nozzle of claim 29, wherein the nanocrystalline material is formed using one of severe plastic deformation, powder compaction or electrode deposition.*

*32. The hot runner nozzle of claim 23, wherein the at least one component comprises a nozzle body.*

*33. The hot runner nozzle of claim 23, wherein the at least one component comprises a nozzle tip.*

*34. The hot runner nozzle of claim 23, wherein the at least one component comprises a tip retainer.*

*35. A hot runner nozzle wherein at least one component comprises a nanocrystalline material.*

*36. A hot runner nozzle assembly comprising at least one component that is at least partially coated with one of a nanocrystalline material and a nanocomposite material.*

*37. The hot runner nozzle assembly of claim 36, wherein the at least one component is coated with a nanocrystalline material using one of electrodeposition, thermal spraying, plasma spraying, pulsed laser deposition or chemical vapor deposition.*

*38. A hot runner nozzle comprising at least one component that is at least partially coated with one of a nanocrystalline material and a nanocomposite material.*

*39. The hot runner nozzle of claim 38, wherein the at least one component comprises at least one of a nozzle body, a nozzle tip, a tip retainer and a melt channel.*

*40. The hot runner nozzle of claim 38, wherein the at least one component is coated with a nanocrystalline material using one of electrodeposition, thermal spraying, plasma spraying, pulsed laser deposition or chemical vapor deposition.*

* * * * *